United States Patent
Chan et al.

(10) Patent No.: US 7,680,827 B2
(45) Date of Patent: Mar. 16, 2010

(54) METHOD OF AUTOMATICALLY SELECTING MULTIMEDIA FILES FOR TRANSFER BETWEEN TWO STORAGE MEDIUMS

(75) Inventors: Astley Kai Kin Chan, Hong Kong (CN); Oliver Yuk Hang Leung, Hong Kong (CN); Iris Cheung, Hong Kong (CN); Dennis Sai Kit Lai, Hong Kong (CN); Jack Lau, Hong Kong (CN)

(73) Assignee: Perception Digital Limited, Clear Water Bay, Kowloon (HK)

( * ) Notice: Subject to any disclaimer, the term of this patent is extended or adjusted under 35 U.S.C. 154(b) by 582 days.

(21) Appl. No.: 11/465,585

(22) Filed: Aug. 18, 2006

(65) Prior Publication Data
US 2007/0043765 A1     Feb. 22, 2007

Related U.S. Application Data

(60) Provisional application No. 60/709,459, filed on Aug. 19, 2005.

(51) Int. Cl.
G06F 7/00   (2006.01)

(52) U.S. Cl. ..................... 707/104.1; 707/10

(58) Field of Classification Search ............... 715/513; 341/87; 707/104.1, 10
See application file for complete search history.

(56) References Cited

U.S. PATENT DOCUMENTS

| 5,400,264 | A  | * | 3/1995  | Phillis et al. ........... 700/90 |
|-----------|----|---|---------|----------------------------------|
| 6,937,171 | B2 | * | 8/2005  | Baldwin et al. ......... 341/87 |
| 7,424,446 | B2 | * | 9/2008  | Emodi et al. ........... 705/26 |
| 2005/0022114 | A1 | * | 1/2005 | Shanahan et al. ...... 715/513 |
| 2005/0210101 | A1 | * | 9/2005 | Janik ................... 709/203 |
| 2006/0248235 | A1 | * | 11/2006 | Eyer ..................... 710/1 |
| 2007/0083471 | A1 | * | 4/2007 | Robbin et al. .......... 705/51 |
| 2008/0021921 | A1 | * | 1/2008 | Horn .................... 707/102 |
| 2008/0045337 | A1 | * | 2/2008 | Blanco .................. 463/35 |
| 2008/0052774 | A1 | * | 2/2008 | Chesla et al. ........... 726/13 |
| 2008/0147715 | A1 | * | 6/2008 | Woodward et al. ...... 707/102 |
| 2008/0228300 | A1 | * | 9/2008 | Tagawa et al. .......... 700/94 |
| 2008/0235732 | A1 | * | 9/2008 | Han et al. .............. 725/46 |
| 2008/0270391 | A1 | * | 10/2008 | Newbold et al. ........ 707/5 |
| 2008/0305738 | A1 | * | 12/2008 | Khedouri et al. ....... 455/3.06 |
| 2009/0007227 | A1 | * | 1/2009 | Burgess et al. ......... 726/1 |
| 2009/0016177 | A1 | * | 1/2009 | Phillips et al. ........ 369/30.06 |

OTHER PUBLICATIONS

Multimedia design and development sound, animation and video, David Ludwig, google.com, pp. 1-8.*
IEEE, no matched results, Nov. 6, 2009, p. 1.*
Only touching the surface: creating affinities between digital content and paper, Paul Luff, Christian Heath, Morira Norrie, Beat Signer, Peter Herdman, 2004, ACM,. p. 1-10.*

* cited by examiner

*Primary Examiner*—Mohammad Ali
*Assistant Examiner*—Donald Lawson
(74) *Attorney, Agent, or Firm*—Leydig, Voit & Mayer, Ltd.

(57) ABSTRACT

A method of automatically selecting at least one of stored multimedia files for transfer between a first storage medium and a second storage medium. In the method, each stored file is assigned a popularity weighting based on popularity information and files are selected that have a popularity weighting within a preferred range.

16 Claims, 7 Drawing Sheets

| Album Name | Artist Name | Genre | Year Published | Song Name | Played Duration | Song Duration |
|---|---|---|---|---|---|---|
| Album 1 | Artist 1 | Genre 1 | Year 1 | Song 1 | 10 | 120 |
| Album 2 | Artist 2 | Genre 2 | Year 2 | Song 2 | 180 | 180 |
| Album 1 | Artist 1 | Genre 1 | Year 1 | Song 1 | 120 | 120 |
| Album 2 | Artist 2 | Genre 2 | Year 2 | Song 2 | 10 | 180 |

FIGURE 5

METHOD OF AUTOMATICALLY SELECTING MULTIMEDIA FILES FOR TRANSFER BETWEEN TWO STORAGE MEDIUMS

FIELD OF THE INVENTION

The current invention related to personal audio equipment and to portable media players and media centers. More particularly the invention relates to a method of automatically selecting multimedia files for transfer between two storage mediums.

BACKGROUND TO THE INVENTION

The widespread use of the Internet as a distribution channel for multimedia data and the advancement in storage technology enable users to have a very large collection of multimedia files. It is not uncommon for a user to have hundreds or even thousands of files stored in the hard drive of a personal computer (PC). The growing of the already very large collection of multimedia files increases the difficulty of accessing the desirable file.

The storage capacity of portable media players is usually much smaller than the storage capacity of a PC. Therefore it is impossible for a user to transfer their whole collection of multimedia files from the PC to a portable unit. The user must select a small portion from the large collection. This becomes increasingly difficulty as the collection grows.

The time required to transfer multimedia files from a PC to a portable unit can take minutes to hours depending on the capacity of the portable unit. As there is a trend in increasing capacity of the portable unit, the time required to fill-up the portable unit with multimedia content will increase. Therefore, it will be a waste of time and create inconvenience to the user if the transferred multimedia content is not the desirable one.

Currently, media player software only allows users to assemble 'playlists' based on a targeted range of capacity. This requires the user to be aware of the remaining capacity of the portable device. Some software allows a selection based on the popularity, source or last access time. However, their implementation is a manual process and requires the attention from users. For example, the user has to recall from his memory whether the most frequently or recently accessed media files are desirable. In short, the current approach requires the attention and active participation of the users to select the desirable content.

OBJECT OF THE INVENTION

It is an object of the present invention to overcome or substantially ameliorate at least one of the above disadvantages and/or more generally to provide an automatic method for selecting multimedia files for transfer between two storage mediums, and in particular from a PC to a media center or from a PC to a portable media player or from a media center to a portable media player.

SUMMARY OF THE INVENTION

Broadly, there is disclosed herein a media center/portable media player with means for automatically updating multimedia files, in particular audio tracks, between a master repository in the media center and the portable player based on various "popularity" criteria. The media center could be either a home entertainment system or a software application running on a PC. The master repository is on either the computer hard drive or the hard drive of the home entertainment system. When the portable media player is connected to the computer or home entertainment system via a USB cable, or comes within range of a wireless connection such as Bluetooth, an automated updating routine is initiated to check for spare space on the portable media player and to automatically update or replace multimedia files according to the "popularity" criteria.

According to the invention there is provided a method of automatically selecting one or more of a plurality of stored multimedia files for transfer between a first storage medium and a second storage medium comprising assigning each stored file a popularity weighting based on popularity information and selecting from among the files those files having a popularity weighting within a preferred range.

The invention also provides a method of selecting from among weighted multimedia files in the second storage medium files to remove from the second storage medium, and a method of selecting from among a plurality of multimedia files stored on the storage mediums two or more groups of files based on two or more different selection criteria.

BRIEF DESCRIPTION OF THE DRAWINGS

A preferred form of the present invention will now be described by way of example with reference to the accompanying drawings, wherein:

FIG. 5 represents a database of multimedia file characteristics.

DESCRIPTION OF INVENTION

Figure 1:
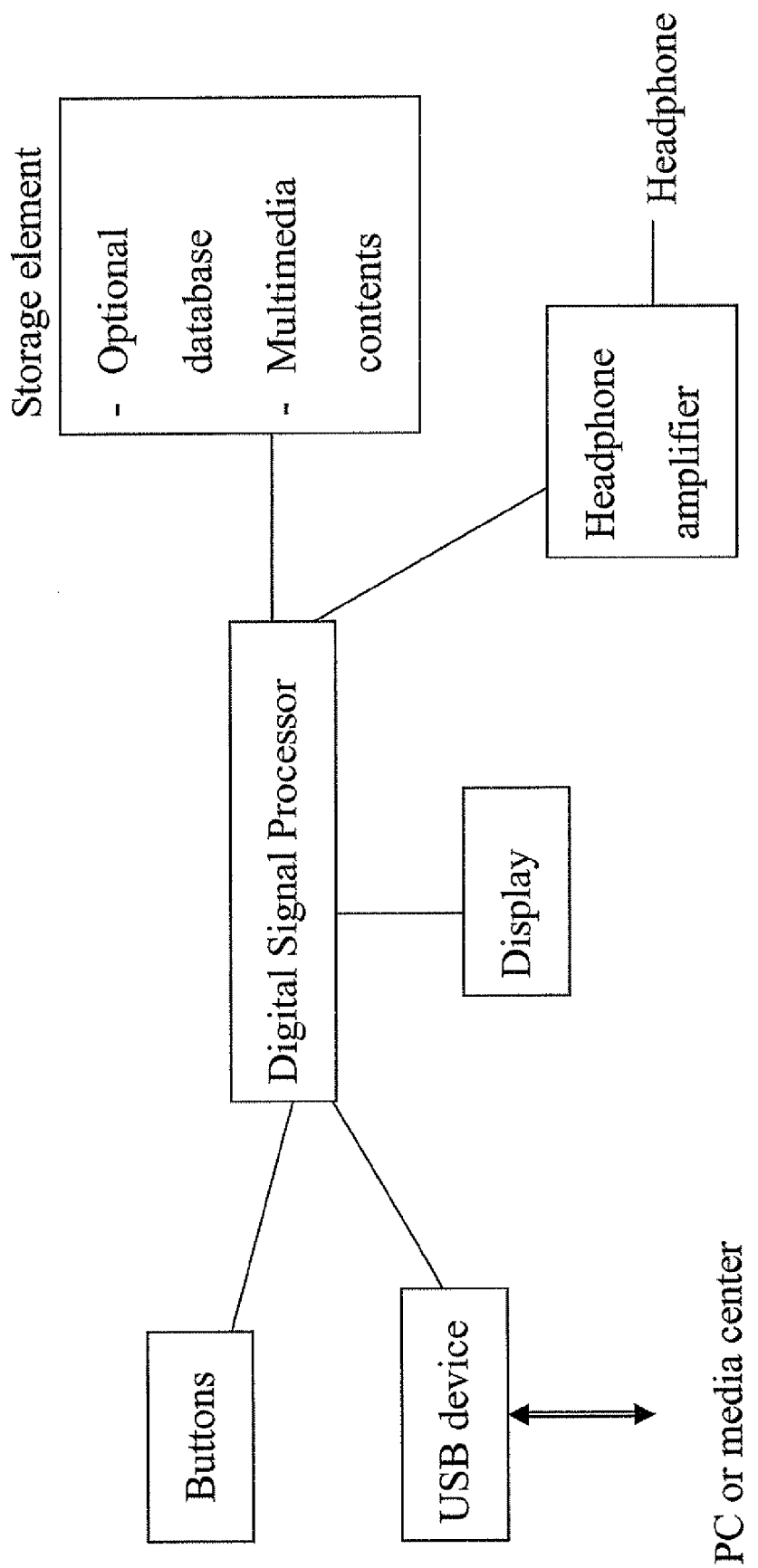
FIG. 1 is a schematic illustration of a portable media player.
Figure 2:
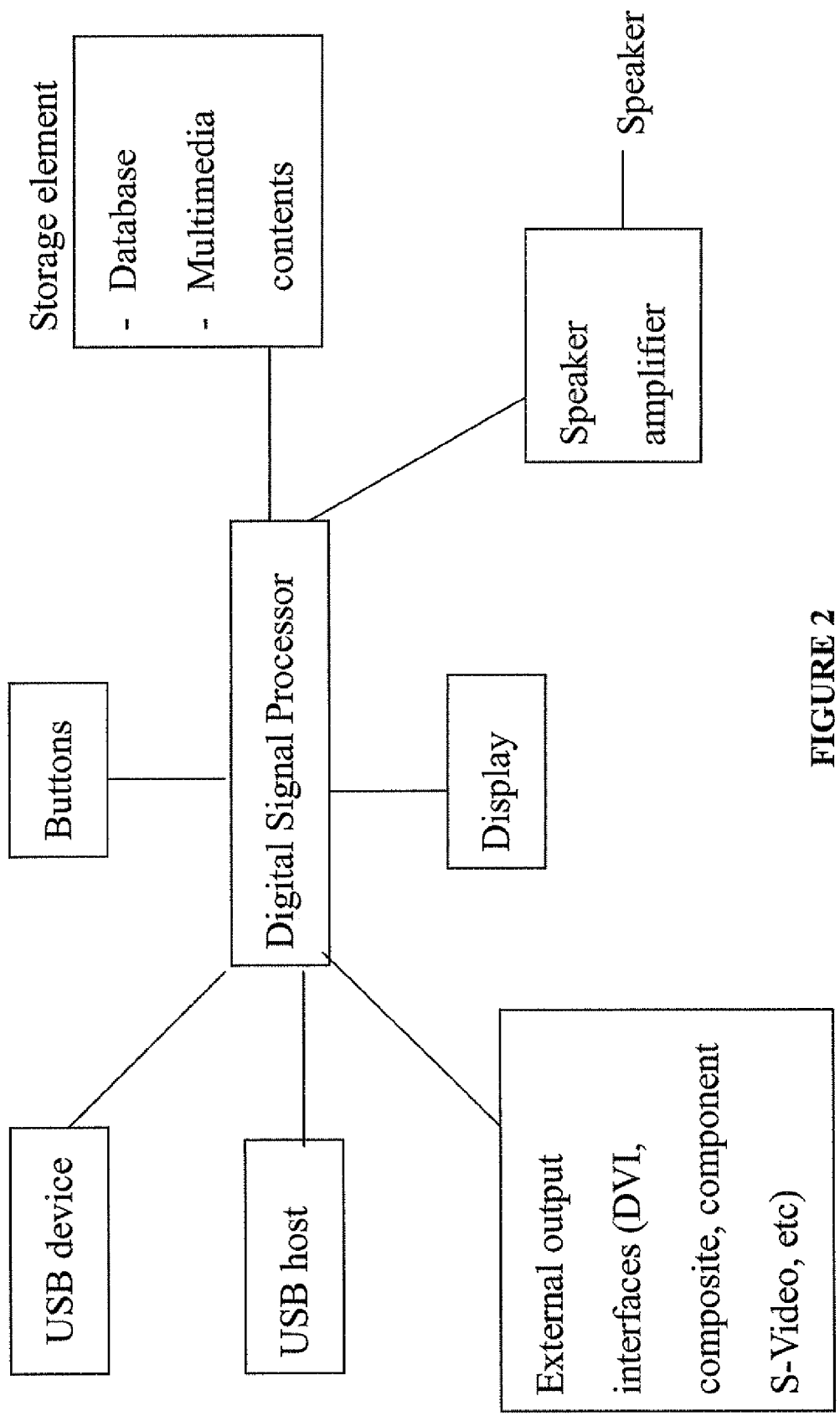
FIG. 2 is a schematic illustration of a media center.

In the preferred embodiment of the invention the method manages and selects audio tracks for use in portable personal audio players. In FIGS. 1 and 2 there is depicted a typical multimedia hardware arrangement. The media center comprises a housing, an amplifier, a display, a digital signal processor, a storage element, external output interfaces, buttons, a USB host for connecting a portable media player, and a USB device for connecting a PC. The portable media player comprises a housing, a headphone amplifier, a display, a digital signal processor, a storage element, buttons, and a USB device for connecting to the media center or a PC.

The storage mediums of the media center and portable media player store the multimedia files and also store a database for recording characteristic data of the multimedia files such as Album, Artist, Genre, Song Title, Publication Year, song duration (length) and a played/accessed duration of the actual length of time of each instance of the file played. An example of the database is shown in FIG. 5. With this database various statistics can be generated. Most importantly, the database shows the user's listening preference. For example, from that database of FIG. 5 it can be observed that user dislike the first and last tracks as they skip over these files fairly quickly each time.

Figure 3:
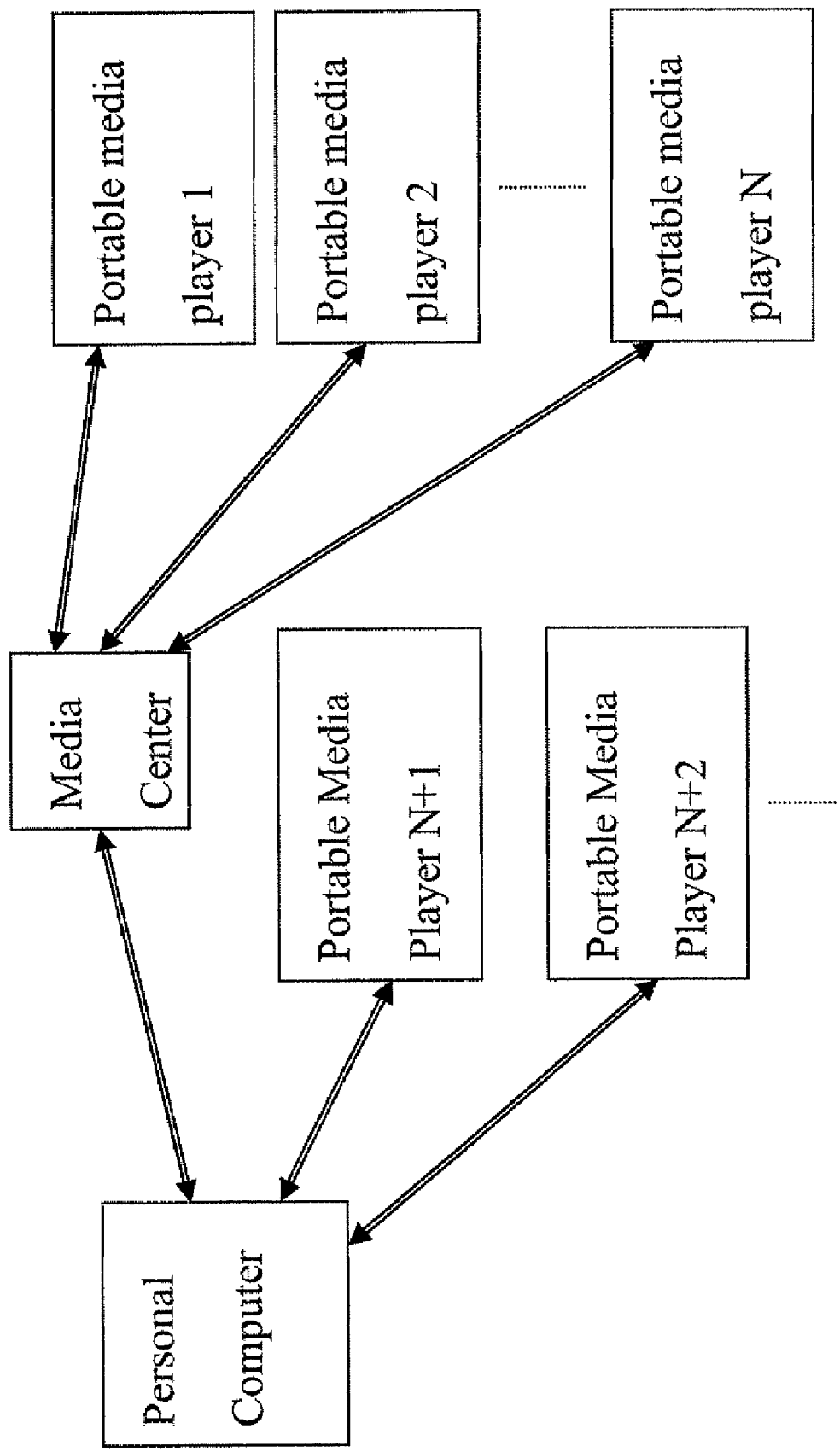
FIG. 3 is a schematic illustration of possible configurations of a PC, media center and portable media player interconnection.

FIG. 3 shows all possible connections of the computer, media center and portable media player. It is possible for the computer to exchange files with the media center; the media center to exchange files with portable media player and the computer to exchange files with the portable media player.

Figure 4:
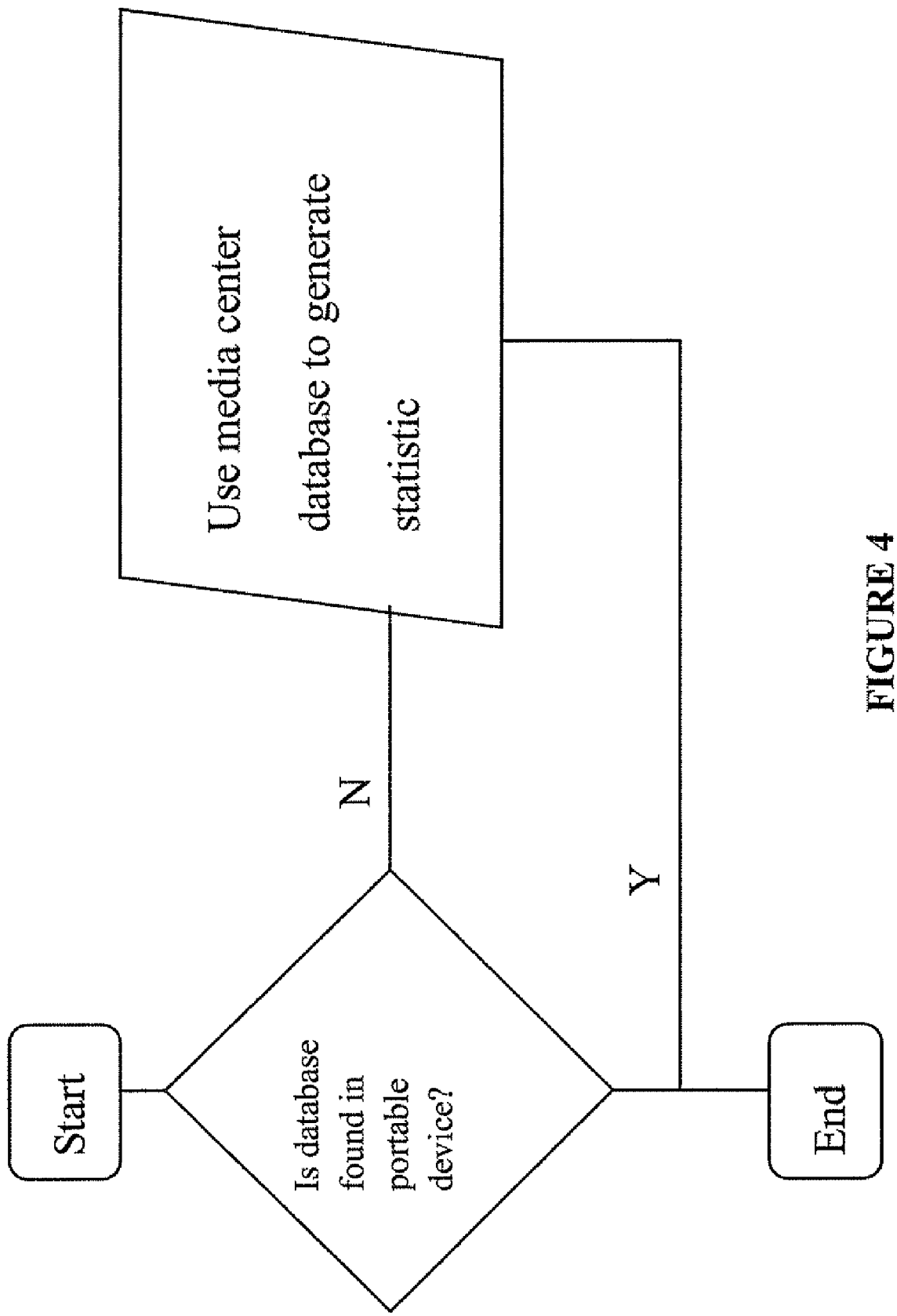
FIG. 4 is a flow chart for initial connection of the portable media player to media center.

In the media center, the multimedia management software will automatically sense the residual capacity of the portable media player. It will also determine if the database exist in the portable media player or not. If there is no database in the portable media player the media center will use its own database to generate the statistic of the album, artist, genre, year, songs, etc. If the database exists in the portable media player, it will use the database on the portable media player to generate the statistics. See FIG. 4.

In one embodiment of the invention, a database for recording the played duration (access time) of a song is implemented. The database is used to generate popularity information for each track characteristic of artist, album, genre, year and song name according to the played duration of the files. The information is calculated from that database statistics using the following equation:

$$P(i) = \sum_{\{j|j \in S(i)\}} \left[ \frac{\text{played duration of track}(j)}{\text{duration of track}(j)} \right]$$

where i is the artist, album, genre, year or song name as the case may be and S(i) is a set comprising all tracks of having the common artist, album, genre, year or song name.

The database also stores information on the last, say 5, plays of the track. These previous played durations are used to compute a last-play weight of the tracks using the following equation:

$$\sum_{j=1}^{5} l_j \times t$$

where l is a coefficient for the $j^{th}$ play of the audio track such that $l_j > l_{j+1}$ and t is $$\left[ \frac{\text{duration of the } j^{th} \text{ play of the track}}{\text{duration of the track}} \right]$$

or 1 if the track has not been played before.

The coefficient $l_j$ is set such that the most recently played time counts most. That is, if the user played a track in full a first time, but skipped through it on the subsequent 4 plays the weight of the track will be low.

The popularity information from each of the artist, album, genre, year and song title characteristics and the last-play weight are then used to compute a track weighting to be applied to the track.

The track weighting is determined using the following equation:

$$\left[ \sum_{\{P(i)|P(i) \in I\}} K(i) \times P(i) \right] \times T(i)$$

where i is the artist, album, genre, year or song name as the case may be; I is a set comprising the one or more of track song, track artist, track album, track genre and track year; K is a weighting constant; P is the listener's preference and T is the last-play duration.

The rationale behind this equation is that if the user like a lot of songs of, say, artist 1, then the popularity information of all tracks by artist 1 will increase. But, if the user dislike a particular song by that artist and skips over it again and again, this factor will be reflected in the last-play weighting which will lower the overall track weighting for that particular track.

In one embodiment, the automated system simply selects the top weighted tracks for transfer to fill-up the sensed residual capacity of the portable media player.

Figure 6:
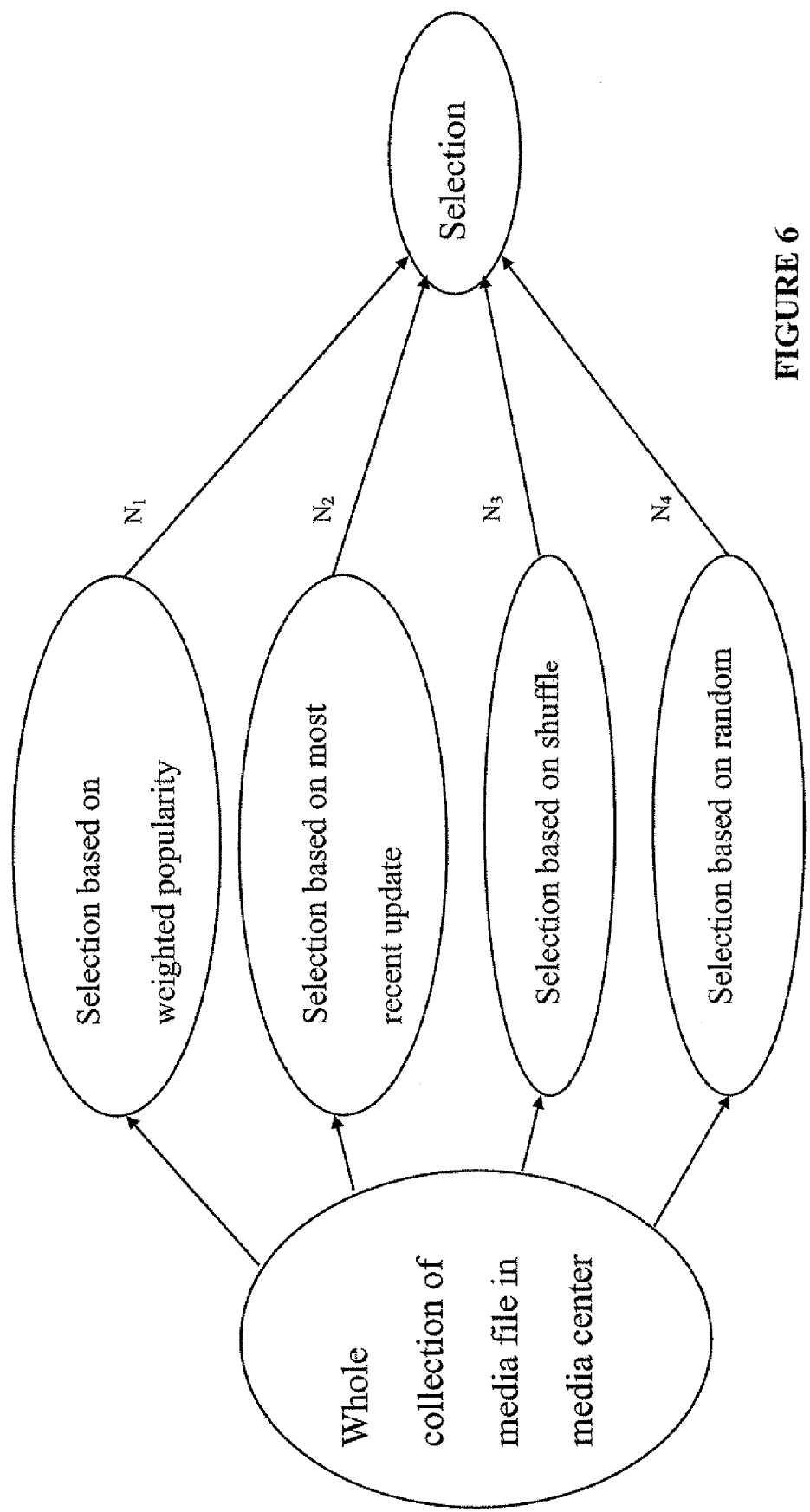
FIG. 6 is a schematic illustration of one embodiment of a selection process according to the invention.
Figure 7:
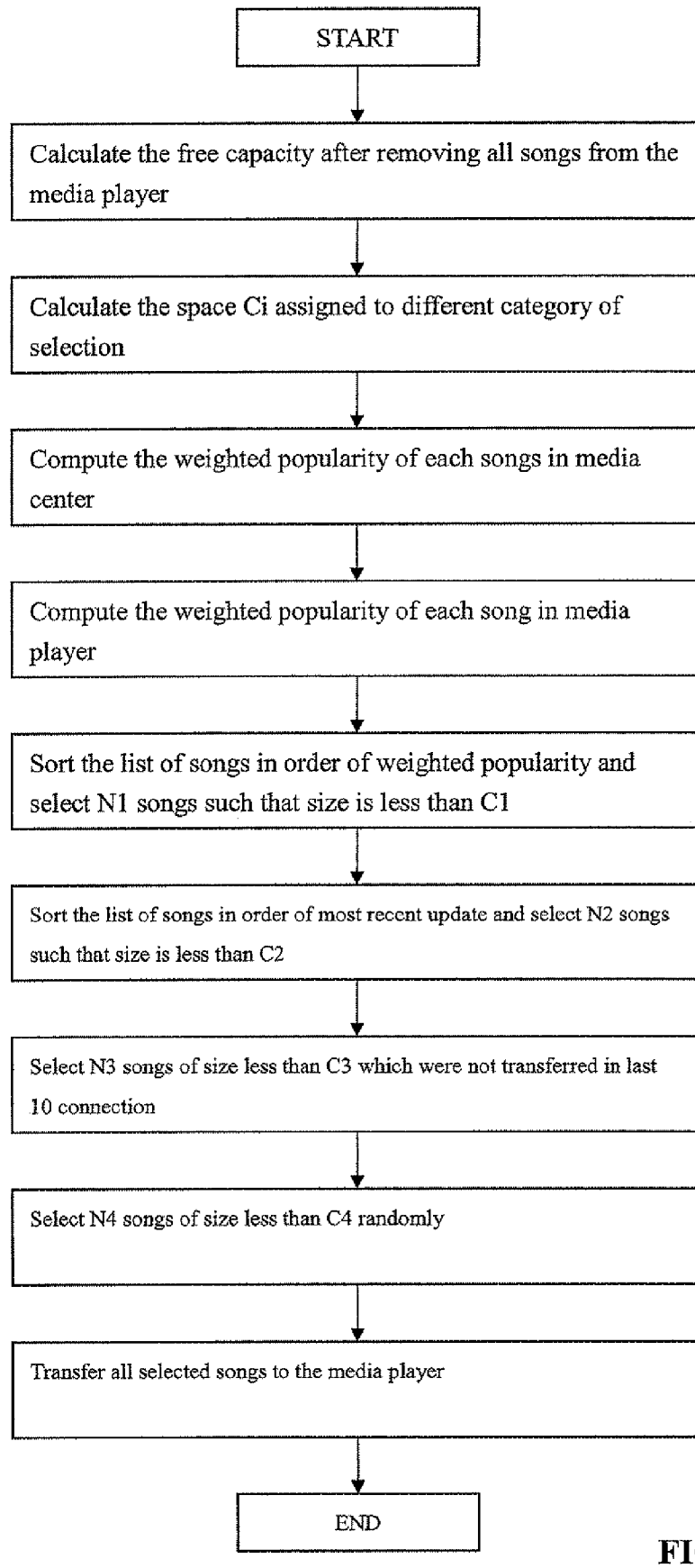
FIG. 7 is a flow chart of the selection process of the embodiment of FIG. 6.

FIGS. 6 and 7 illustrate a selection process of an alternative embodiment of the invention. Several smaller collections are selected base on criteria like shuffle, random, weighted popularity and recent addition. The selections are then further shrunk down based on the available capacity and the songs to be replaced in the portable unit. The sensed residual capacity of the portable media player is divided between four selection groups and Ni songs from each group are selected to put on the portable media player.

To provide additional space in the portable unit and ensure only the most popular files are stored on it a replacement scheme is performed by comparing the weighted popularity of the whole collection in the media center against the weighted popularity of the collection in the portable unit. If the weighted popularity of a track on the portable media player is less than a certain amount of the mean weighted popularity, then the track will be removed from the portable media player to free up space for the new selection.

Advantages of the current invention are that it automatically sense the residual capacity of the receiving unit and selects multimedia files to be transfer without attention from user. The invention can also facilitate the automatic replacement of unpopular songs in the receiving unit without attention from user.

The invention provides a method that, among other things, computes the popularity of a song using the number of times the song was played, computes the popularity of a song based on whether the whole song was played or just part of the song was played, computes the popularity of an artist or album or genre based on the popularity of all songs of that artist or album or genre.

As the database is continually being updated as the user listens to the tracks the method is adaptive to the user's changing behaviour and the weighted popularity of tracks will adjust according to the user's preference on a daily bases.

It should be appreciate those modifications and alternations obvious to those skilled in the art are not to be considered as beyond the scope of the present invention. For example the invention can allow bi-directional music transfer as indicated as media center in FIG. 3. The invention is particularly applicable to audio files but can be used to manage video, still image, text and other media files.

What is claimed is:

1. In a system including a main unit including a first memory storing a plurality of multimedia files and a first digital signal processor for digitally processing the multimedia files, a portable unit including a second memory storing a plurality of multimedia files, the second memory having a storage capacity smaller than storage capacity of the first memory and storing fewer multimedia files than the first memory, and a second digital processor for digitally processing the multimedia files, and an interface connecting the first and second memories to each other for selectively transferring multimedia files stored in the first memory to the second memory, a method for selecting a subset of the multimedia files stored in the first memory for transfer to the second memory and transferring the multimedia files selected to the second memory, the method comprising:

determining a weighting for each multimedia file, the weighting being based upon (i) popularity information, P(i), given by $$P(i) = \sum_{\{j|j \in S(i)\}} \left[ \frac{\text{duration of access of file}(j)}{\text{duration/length of file}(j)} \right],$$

where i is multimedia file name, multimedia file artist, multimedia file album, multimedia file genre, and publication year of the multimedia file, and S(i) is a set comprising all multimedia files, and (ii) last-play duration weight, T(i), given by $$T(i) = \sum_{j=1}^{5} l_j \times t,$$

where l is a coefficient for the $j^{th}$ access of the multimedia file such that $l_j > l_{j+1}$ and $t$ is $\left[ \dfrac{\text{duration of the } j^{th} \text{ access of the multimedia file } (i)}{\text{duration of the multimedia file } (i)} \right]$ or 1 if the multimedia file has not been accessed previously, and the weighting, W(i), is given by $$W(i) = \left[ \sum_{\{P(i)|P(i) \in I\}} K(i) \times P(i) \right] \times T(i),$$

wherein I is a set comprising at least one of the multimedia file name, the multimedia file artist, the multimedia file album, the multimedia file genre, and the publication year of the multimedia file, and K is a weighting constant; and transferring to the second memory from the first memory the multimedia files with the highest weighting until the second memory is completely filled with multimedia files.

2. The method according to claim 1 including, before transferring multimedia files from the first memory to the second memory, determining mean weighting of the multimedia files stored in the second memory, and deleting from the second memory multimedia files having a weighting less than the mean waiting of the multimedia files stored in the second memory.

3. In a system including a main unit including a first memory storing a plurality of audio tracks, and a first digital signal processor for digitally processing the audio tracks, a portable unit including a second memory storing a plurality of audio tracks, the second memory having a storage capacity smaller than storage capacity of the first memory and storing fewer audio tracks than the first memory, and a second digital processor for digitally processing the audio tracks, and an interface connecting the first and second memories to each other for selectively transferring audio tracks stored in the first memory to the second memory, a method for selecting a subset of the audio tracks stored in the first memory for transfer to the second memory and transferring the audio tracks selected to the second memory, the method comprising:

determining available storage capacity of the second memory;

determining a weighting for each audio track, the weighting being based upon (i) popularity information, P(i), given by $$P(i) = \sum_{\{j|j \in S(i)\}} \left[ \frac{\text{accessed duration of access of audio track } (i)}{\text{duration of audio track } (i)} \right],$$

where i is audio track name, audio track artist, audio track album, audio track genre, and publication year of the audio track, and S(i) is a set comprising all audio tracks, and (ii) last-play duration weight, T(i), given by $$T(i) = \sum_{j=1}^{5} l_j \times t,$$

where l is a coefficient for the $j^{th}$ access of the audio track such that $l_j > l_{j+1}$ and $t$ is $\left[ \dfrac{\text{duration of the } j^{th} \text{ access of the audio track } (i)}{\text{duration of the audio track } (i)} \right]$ or 1 if the audio track has not been accessed previously, and the weighting, W(i), is given by $$W(i) = \left[ \sum_{\{P(i)|P(i) \in I\}} K(i) \times P(i) \right] \times T(i),$$

wherein I is a set comprising at least one of the audio track name, the audio track artist, the audio track album, the audio track genre, and the publication year of the audio track, and K is a weighting constant; and transferring to the second memory from the first memory the audio tracks with the highest weighting until the second memory is completely filled with audio tracks.

4. The method according to claim 3 including, before transferring audio tracks from the first memory to the second memory, determining mean weighting of the audio tracks stored in the second memory, and deleting from the second memory audio tracks having a weighting less than the mean waiting of the audio tracks stored in the second memory.

5. The method according to claim 3 further comprising providing, in one of the first and second memories, a database comprising the popularity information of each of the stored audio tracks.

6. The method of claim 5 wherein the database includes the audio track name, the audio track artist, the audio track album, the audio track genre, the publication year of the audio track, and at least one of played duration of the audio track, and duration of the audio track, for each of the audio tracks.

7. The method of claim 5 wherein the database is in the second memory.

8. The method according to claim 3, further comprising:

dividing the available memory capacity of the second memory into at least two memory allocations; and selecting from among the plurality of audio tracks stored in the first memory at least two groups of audio tracks for transfer to the first memory so that the groups of audio tracks fill the respective memory allocations.

9. The method according to claim 8 wherein the at least two groups of audio tracks are selected according to respective selection criteria comprising at least two of:
- most popular audio tracks based on the weightings,
- most recently selected audio tracks in at least one previous selection,
- audio tracks not previously selected in at least one previous selection, and
- randomly selected audio tracks.

10. In a system including
- a main unit including a first memory storing a plurality of audio tracks, and a first digital signal processor for digitally processing the audio tracks,
- a portable unit including a second memory storing a plurality of audio tracks, the second memory having a storage capacity smaller than storage capacity of the first memory and storing fewer audio tracks than the first memory, and a second digital processor for digitally processing the audio tracks, and
- an interface connecting the first and second memories to each other for selectively transferring audio tracks stored in the first memory to the second memory, a method for selecting a subset of the audio tracks stored in the first memory for transfer to the second memory and transferring the audio tracks selected to the second memory, the method comprising:

determining available storage capacity of the second memory;

determining a weighting for each audio track, the weighting, W(i), being given by $$W(i) = \sum_{\{P(i)|P(i) \in I\}} K(i) \times P(i)$$

wherein I is a set comprising at least one of audio track name, audio track artist, audio track album, audio track genre, and publication year of the audio track, K is a weighting constant; and $$P(i) = \sum_{\{j|j \in S(i)\}} \left[ \frac{\text{accessed duration of access of audio track } (i)}{\text{duration of audio track } (i)} \right],$$

where i is the audio track name, the audio track artist, the audio track album, the audio track genre, and the publication year of the audio track, and S(i) is a set comprising all audio tracks; and transferring to the second memory from the first memory the audio tracks with the highest weighting until the second memory is completely filled with audio tracks.

11. The method according to claim 10, further comprising:
dividing the available memory capacity of the second memory into at least two memory allocations; and
selecting from among the plurality of audio tracks stored in the first memory at least two groups of audio tracks for transfer to the first memory so that the groups of audio tracks fill the respective memory allocations.

12. The method according to claim 11 wherein the at least two groups of audio tracks are selected according to respective selection criteria comprising at least two of:
- most popular audio tracks based on the weightings,
- most recently selected audio tracks in at least one previous selection,
- audio tracks not previously selected in at least one previous selection, and
- randomly selected audio tracks.

13. The method according to claim 10 including, before transferring audio tracks from the first memory to the second memory,
determining mean weighting of the audio tracks stored in the second memory, and
deleting from the second memory audio tracks having a weighting less than the mean waiting of the audio tracks stored in the second memory.

14. The method according to claim 10 further comprising providing, in one of the first and second memories, a database comprising the popularity information of each of the stored audio tracks.

15. The method of claim 14 wherein the database includes the audio track name, the audio track artist, the audio track album, the audio track genre, the publication year of the audio track, and at least one of played duration of the audio track, and duration of the audio track, for each of the audio tracks.

16. The method of claim 14 wherein the database is in the second memory.

* * * * *